INVENTOR
WILLIAM R. MOUNCE
ATTORNEY

United States Patent Office 3,579,436
Patented May 18, 1971

3,579,436
MULTISTAGE CONVERSION PROCESS
William R. Mounce, East Windsor Township, N.J., assignor to Cities Service Research and Development Company, New York, N.Y.
Filed June 30, 1969, Ser. No. 837,750
Int. Cl. C10g *13/00*
U.S. Cl. 208—59                                    9 Claims

ABSTRACT OF THE DISCLOSURE

A process for the efficient hydrocracking of a heavy hydrocarbon oil such as vacuum or atmospheric residuums is disclosed herein. The heavy oil is contacted with hydrogen in the presence of a particulate catalyst at high pressures, preferably between 1,500 and about 3,000 p.s.i., and high temperatures, preferably between 800° F. and 850° F., by passing the heavy oil and a hydrogen containing gas upwardly through the particulate catalyst in a first reactor. Effluent from the first reactor is mixed with a hydrocarbon diluent and passed upwardly through a catalyst bed in a second high pressure and high temperature reactor maintained at similar conditions to the first reactor. Oil is withdrawn from the second reactor for further processing as may be desired. Preferably the diluent is a hydrocarbon stream boiling in the range of from 500° to 975° F. and more preferably 600° F. to 800° F. and is mixed with the effluent from the first reactor in the amount of from 20% to 100% by volume of the volume of the effluent.

BACKGROUND OF THE INVENTION

This invention relates to an improved process for the refining of crude oil. More particularly, it relates to an improved process for treating a heavy hydrocarbon oil, such as vacuum or atmospheric residuum with hydrogen to convert the heavy oil to a more useful lower-boiling hydrocarbon product.

Hydroprocessing is increasingly being employed commerically to upgrade and convert various heavy hydrocarbon oils into more desirable products. In one particularly useful process, the hydrocarbon oil is passed into the bottom of a cylindrical reactor together with large volumes of hydrogen in the presence of a particulate catalyst. The mixture is caused to flow generally in an upward direction either expanding a particulate catalyst bed as in the process described in U.S. Pat No. Re. 25,770, issued Apr. 27, 1965, to E. S. Johanson or a hydrocracking process comprising suspending finer type particulate catalysts in the liquid phase of the reactant while liquid and/or gaseous product together with gaseous effluents are withdrawn from the top of the reactor. The reactor is maintained at temperatures in excess of 800° F. and pressures in excess of 1,500 p.s.i. This procedure results in a relatively uniform catalyst bed temperature which in turn prolongs the useful life of catalyst, prevents severe coking and achieves the desired conversion. In treating heavy hydrocarbons boiling above 975° F., it is known that the use of gas oil diluents such as heavy gas oil, decant oil, and cycle oils allows higher conversion rates to be obtained in a single reactor. However, as the amount of diluent used in the single reactor process increases, the costs increase due to the lower throughput of residual oil feed per reactor volume.

SUMMARY OF THE INVENTION

Accordingly, I have invented a process for achieving an increased hydrocracking of heavy hydrocarbon oils by the utilization of multi-stage reactors. The process comprises feeding the heavy hydrocarbon oil and hydrogen gas upward through a particulate catalyst bed in a first reactor operated at pressures in excess of 1,500 p.s.i. and temperatures in excess of 800° F. The treated hydrocarbon oil is withdrawn from the first reactor and mixed with additional hydrogen gas and a liquid hydrocarbon oil diluent boiling in the range of from 500° F. to about 975° F. The mixture is then fed into a second reactor and passed upwardly through a particulate catalyst bed, expanding the bed, the second reactor being maintained at pressures in exces of 1,500 p.s.i. and temperatures in excess of 800° F. Diluent used is any hydrocarbon fraction or stream boiling in the range of from 500° F. to 975° F., that is below the boiling range of the unconverted heavy hydrocrabon oil. Preferably the diluent is a hydrocarbon stream boiling in the 600° F. to 800° F. range, and is preferably any suitable refinery stream boiling in the aforesaid range and available for such use as for instance, catalytic cracker cycle oil, coker gas-oils, virgin gas-oil, lube oil extracts, and decant oil. The diluent will remain predominantly liquid at the operating pressure and temperatures in the second stage to effect the required dilution. The treated hydrocarbons from the second reactor after being withdrawn are preferably fed t₀ a fractionation column for further processing, the diluent being obtained from a fraction boiling between 500° F. and 975° F. and separated by the fractionator.

It is therefore an object of this invention to provide a process for the increased and more efficient hydroconversion of heavy hydrocarbon oil feeds.

Other objects and advantages of the process of this invention will be apparent from the drawing and description of the preferred embodiments which follow.

DESCRIPTION OF THE PREFERRED EMBODIMENTS

Figure 1:
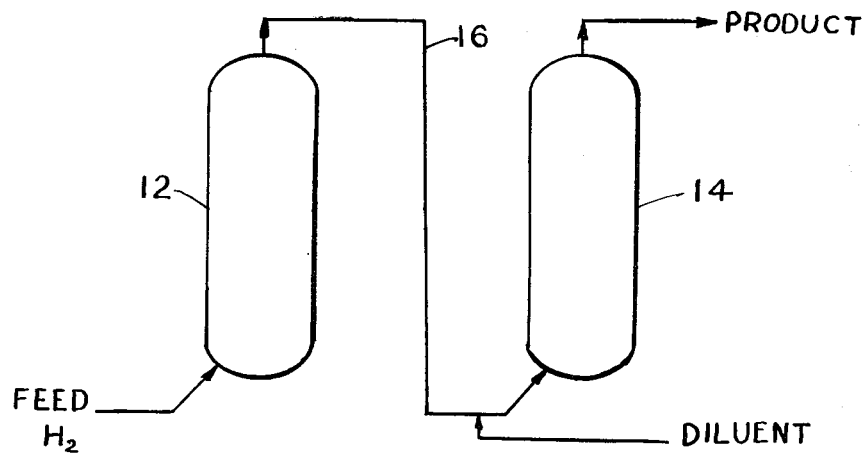
FIG. 1 of the drawings is a schematic drawing of one form of the hydrocarbon conversion process of this invention.

With reference to FIG. 1 of the drawings, the process is illustrated as initiated by a first stage hydrocracking of a heavy hydrocarbon oil feed in a first reactor vessel 12. The heavy hydrocarbon oil feed may be any hydrocarbon oil derived from petroleum oil, shale oil, tar sands or coal, and containing a large proportion of oil boiling above 975° F. Examples of heavy hydrocarbon oil feeds suitable for use with the method according to this invention are vacuum and atmospheric residuums, coal tar and other heavy hydrocarbon oils. The feed together with a hydrogen containing gas is fed to the first reactor. A particulate catalyst bed is maintained in the reactor and feed and hydrogen gas are passed upwardly therethrough expanding the bed and inducing random motion among the catalyst particles.

The particulate catalyst may be any suitable hydrogenation catalyst ranging in size from 100 microns to about ⅟₃₂ inch. The catalyst is maintained in an expanded bed by the upward velocity of the fluids within the reactor causing the bed to expand up to five times its original volume. Hydrocracking in the first reactor is carried out at pressures between 1,500 p.s.i., and about 4,000 p.s.i. and temperatures of from about 800° F. to about 900° F. Within these parameters, conversion of the heavy hydrocarbon feed is on the order of from about 40% to about 80% by volume of the original feed, the upper limit being most difficult to reach and maintain. Generally, the conversion rate with feedstocks such as vacuum or atmospheric residuum is on the order from about 40% to about 60% with about 50% being the practical sustainable rate.

Effluent withdrawn from the first hydrocracking reactor contains from about 40% to about 60% of the original high boiling hydrocarbon feed. The effluent is passed to a second hydrocracking reactor 14 via a transfer conduit 16 in which it is mixed with a hydrocarbon oil diluent stream boiling in the range of from about 500° F. to 975° F. and preferably one boiling from about 600° F. to about 800° F. The diluent is in the amount of from 20% to about 100% by volume per volume of feed to the second reactor.

The mixed effluent, and hydrocarbon oil diluent is passed into the bottom of the second hydrocracking reactor and caused to flow upwardly in the reactor at an upward velocity sufficient to expand the particulate catalyst bed in the second reactor. The second reactor is maintained at similar operating conditions to those found in the first reactor, specifically a pressure in excess of 1,500 p.s.i. and a temperature range of from 800° F. to about 900° F. The preferred pressure is in the range of 1,500 p.s.i. to about 3,000 p.s.i. and the preferred temperature is in the range of from about 800° F. to about 850° F. The particulate catalyst similarly may also be any suitably hydrotreating catalyst in the size range of from about 100 microns to about 1/32 inch in diameter, the bed being similarly expanded as is indicated for the catalyst bed in the first reactor vessel.

Figure 2:
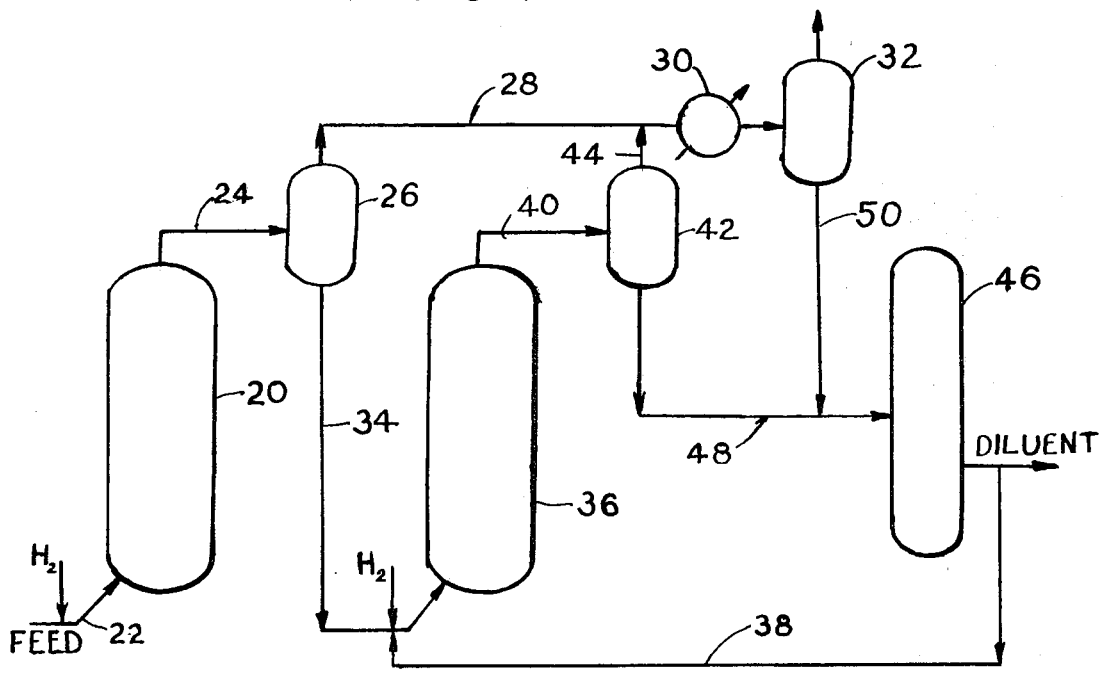
FIG. 2 is a schematic drawing of another embodiment of the process of this invention.

More particularly, a process embodying the method of this invention is shown in FIG. 2 of the drawings where the feed, preferably a residuum comprising at least 50% by volume of hydrocarbon material boiling above 975° F. and more preferably containing at least 75% by volume boiling above 975° F. is fed into the bottom of a first reactor vessel 20. A hydrogen containing gas is mixed with the fresh feed in feed conduit 22 just prior to entering the first reactor vessel 20. The first vessel 20 is preferably maintained at a temperature of about between 800° F. and 850° F. and a pressure of between 1,500 and about 3,000 p.s.i. by sufficiently preheating the feedstock and the hydrogen containing gas prior to entry into the vessel, so that the exothermic hydrogenation reaction will cause the desired reactor temperature to be obtained. The hydrogen containing gas from a source not shown is mixed with the feed in feed conduit 22 in the amount of from 5,000 to about 15,000 standard cubic feet (s.c.f.) per barrel of fresh feed and fed into the reactor 20. A suitable particulate hydrogenation catalyst is located in the reactor vessel 20. Catalysts which are conventionally employed in hydrogenation processes may be used particularly cobalt-molybdena catalyst supported on alumina, although other suitable catalyst compositions such as natural clays, nickel-molybdena on alumina and others known in the art may be used. The nature of the feed and the high pressure serve to maintain the hydrocarbon materials in the liquid state in the reactor and the upwardly flowing fluids thereby act to expand the catalyst bed and induce random motion of the catalyst particles in the bed. This materially increases the useful life of the catalyst, maintains a more uniform temperature within the catalyst bed, prevents severe coking, and provides for the effective hydrocracking, and hydrodesulfurization obtainable with such a process. Space velocity in the reactor is maintained at from 0.2 to 1 volume of feed per hour per reactor volume (vol./hr./vol.).

A conduit 24 is connected to the top of the reactor vessel 20 and serves as a withdrawal conduit for effluent from the vessel. The conduit 24 is connected at its downstream end to a gas-liquid separator 26, which as its name implies separates the effluent stream into its vapor and liquid components. Vapor components are removed from the separator 26 via a pipe 28, subjected to cooling in cooler 30 and then to another vapor-liquid separation in a second gas-liquid separator 32. The liquid components of the effluent stream are removed from the separator via pipe 34 which connects at its downstream end to the bottom of a second high pressure, high temperature reactor vessel 36. Also connected to the pipe 34 at points intermediate its ends are a diluent recycle conduit 38 and a hydrogen gas feed pipe. The hydrogen containing gas is obtained from a source not shown and is supplied in the amount of from 5,000 to 15,000 s.c.f. of hydrogen per barrel of liquid hydrocarbon and diluent. Diluent as previously described may be any suitable hydrocarbon stream boiling in the range of from 500° F. to 975° F., but as preferred for this embodiment it is a recycled heavy gas-oil fraction boiling in the 600° F. to 800° F. range, and obtained by fractionating the product stream as will be hereinafter described. The amount of diluent mixed with the liquid hydrocarbon stream is in the range of from about 20% vol. to about 100% vol. of the stream, depending on the amount of conversion desired in second reactor and characteristics of feedstocks. That is the higher the desired second reactor conversion and the more severe the reactor conditions (temperature and residence time) the greater amount of diluent that should be added.

The mixed hydrocarbon stream, diluent stream and hydrogen containing gas is fed into the second reactor vessel 36 which is maintained at substantially the same pressure and temperature as the first stage vessel 20. Similarly, the particulate catalyst employed in the vessel 36 may be the same as is used in the first vessel 20, i.e., a cobalt-molybdena on alumina extrudates. Similarly, the same space velocities, similar reactor volume and construction as the first vessel 20 are characteristic of the second reactor vessel 36.

Effluent from the second vessel is removed via a withdrawal conduit 40 connected to the top of the second vessel 36. The withdrawn effluent stream is similarly subjected to a vapor-liquid separation in a third gas-liquid separator 42 connected to the withdrawal conduit 40. Separated vapor is passed via connecting pipe 44 to pipe 28, and mixed with the separated vapor stream from the first vessel. The liquid stream from the third-gas liquid separator 42 is passed as feed to a fractionating column 46 by a pipe 48 connecting the gas-liquid separator to the fractionating column. A liquid hydrocarbon stream separated by the second gas-liquid separator 32 is also passed to the fractionating column via a pipe 50 connecting the second separator 32 to pipe 48. Diluent is obtained by recycling all or a portion of the heavy gas oil fraction (boiling in the range of from 650° F. to 975° F.) via pipe 38 to the feed pipe to the second reactor vessel 36.

With a view of further illustrating the process of this invention but not as a limitation thereon, the following examples are given.

EXAMPLE I 10,000 barrels per day (b.p.d.) of a vacuum residuum containing 100% by volume of material boiling above 975° F. is fed together with about 5000 s.c.f. of hydrogen per barrel of feed into the bottom of a first stage reactor containing a hydrogenation catalyst. The catalyst is an extruded particulate molybdena-cobalt catalyst supported on an alumina base and is maintained in an expanded catalyst bed at a concentration of about 30 pounds per cubic foot of bed by the upflowing fluids in the reactor. The vessel is maintained at a temperature of about 840° F. and a hydrogen partial pressure of 2,200 p.s.i. with a space velocity of 1.0 volume of feed per hour per volume of reactor (vol./hr./vol.) Effluent removed from the first stage vessel comprises about 4,000 b.p.d. of hydrocarbon boiling about 975° F. and 6,300 b.p.d. of hydrocarbon products boiling below 975° F., indicating a conversion rate of about 60% in the first stage reactor.

The effluent oil is then mixed with 5,000 b.p.d. of a heavy gas-oil diluent boiling in the range of from 600° F. to about 800° F. The mixed diluent and effluent oil stream is introduced into the bottom of the second reactor vessel. The second reactor is maintained at a temperature of about 840° F. and a hydrogen partial pressure of 2,200 p.s.i.

with a space velocity of 0.5 vol./hr./vol. Catalyst employed in the second vessel is the same as is used in the first vessel. The product from the second vessel comprises about 1,600 b.p.d. of oil boiling above 975° F. and 14,000 b.p.d. of oil boiling in the $C_4$ to 975° F. range.

The overall conversion rate for material boiling above 975° F. when processed according to this example is therefore 84%. Overall space velocity is 0.33, and residuum conversion per reactor volume is 1.22 b.p.d. per ft.³ reactor volume. This may be contrasted with a single reactor operating at an 84% conversion in which the space velocity is 0.25 vol./hr./vol. and diluent useage is 10,000 b.p.d., and where the residual conversion is only 0.92 b.p.d. per ft.³. Similar results to the latter are encountered when using two stages with diluent being fed together with the feed into the first stage.

EXAMPLE II

Utilizing the process of this invention as exemplified in FIG. 2 of the drawings, 10,000 b.p.d. of a vacuum residuum comprising close to 100% of hydrocarbon materials boiling above 975° F., and 5,000 s.c.f. of hydrogen per barrel of feed is fed to the bottom of the first reactor vessel. The vessel is maintained at a temperature of about 840° F. and a hydrogen partial pressure of 2,200 p.s.i. Effluent is withdrawn from the first reactor vessel and subjected to vapor-liquid separation. A stream of about 6,000 b.p.d. of liquid hydrocarbon is obtained and fed together with 5,000 b.p.d. of heavy gas oil diluent (fraction) and 5,000 s.c.f. of hydrogen per barrel of feed to the second reactor vessel. The feed to the second vessel comprises about 4,000 b.p.d. of hydrocarbon oil boiling above 975° F. Effluent from the second vessel is fed to another gas-liquid separator and the resulting liquid product stream (5,000 b.p.d.) is then passed to a fractionation column. Additionally the vapor streams from both of the gas-liquid separators are cooled and subjected to another vapor-liquid separation yielding about 10,600 b.p.d. of liquid product which is mixed with the other liquid product stream into the fractionation column. Product yield from the fractionation column comprises about 1,600 b.p.d. of oil boiling above 975° F., and 14,000 b.p.d. of other fractions, i.e., naphtha, furnace oil, gas and heavy gas-oil. 5,000 b.p.d. of the heavy gas-oil fraction is recycled to the second reactor as diluent.

Having fully described the process of this invention and wishing to cover those modifications and variations which would be apparent to those skilled in the art but without departing from the spirit and scope of the invention.

I claim:

1. In a process for hydrocracking a residual hydrocarbon oil by treating said residual oil with hydrogen at pressures above 1,500 p.s.i. and temperatures above 800° F. in the presence of a particulate catalyst, the steps comprising, passing said residual oil, and a hydrogen containing gas upwardly through a particulate catalyst bed in a first hydrocracking zone maintained at a pressure in the range of from about 1,500 p.s.i. to about 4,000 p.s.i. and a temperature in the range of from 800° to 900° F., withdrawing hydrocarbon effluent from said first hydrocracking zone, passing said withdrawn hydrocarbon effluent, and a hydrocarbon oil diluent boiling in the range of from 500° F. to about 975° F. upwardly through an expanded catalyst bed in a second hydrocracking zone maintained at a pressure in the range of from 1,500 p.s.i. to about 4,000 p.s.i. and a temperature in the range of from 800° F. to about 900° F., and withdrawing a second hydrocarbon oil effluent stream from said second hydrocarbon zone as product.

2. The process according to claim 1 wherein said first hydrocarbon effluent stream withdrawn from said first zone is first subjected to the step of separating the first hydrocarbon effluent stream into liquid and vapor components, and passing said liquid hydrocarbon component into said second hydrocracking zone.

3. The process of claim 1 wherein said residual oil is a residual oil comprising at least 50% vol. hydrocarbon material boiling above 975° F.

4. The process of claim 2 wherein said residual oil is a residual oil comprising at least 50% vol. hydrocarbon material boiling above 975° F.

5. The process of claim 1 wherein said diluent is in the amount of from about 20% to about 100% by volume of the heavy hydrocarbon oil feed.

6. The process of claim 1 wherein said diluent is a hydrocarbon oil boiling in the range of from about 600° F. to about 800° F.

7. The process of claim 1 which additionally comprises the steps of fractionating said hydrocarbon product withdrawn from said second zone into fractions including a diluent fraction boiling in the range of from 500° F. to about 975° F. and recycling said diluent fraction to said second zone as said diluent.

8. The process of claim 7 wherein said first and second hydrocracking zones are maintained at temperatures between 800° F. and 850° F. and pressures in the range of 2,000 p.s.i. to 3,000 p.s.i.

9. In a process for hydrocracking a residual hydrocarbon oil having at least 50% by vol. hydrocarbon material boiling above 975° F., the steps comprising, passing said residual oil and a hydrogen containing gas upwardly through an expanded particulate catalyst bed in a first hydrocarcking zone, said first zone being maintained at a pressure in the range of from about 1,500 p.s.i. to about 3,000 p.s.i. and a temperature in the range of from about 800° F. to about 850° F., withdrawing a first hydrocracked hydrocarbon effluent from said first hydrocracking zone, separating said withdrawn first stage hydrocracked hydrocarbon effluent into liquid and vapor component streams, passing said separated liquid component stream, a hydrogen containing gas and a hydrocarbon oil diluent boiling in the range of from about 500° F. to about 975° F. upwardly through an expanded particulate catalyst bed in a second hydrocracking zone, said second hydrocracking zone being maintained at a pressure in the range of from 1,500 p.s.i. to about 3,000 p.s.i. and a temperature in the range of from about 800° F. to about 850° F., withdrawing a second hydrocarbon effluent from said second zone, separating said second effluent into fractions, said fractions including a hydrocarbon oil fraction boiling in the range of from 500° F. to 975° F. as said diluent, and recycling said fraction as said diluent to said second hydrocracking zone with said first hydrocarbon effluent.

References Cited

UNITED STATES PATENTS

| | | | |
|---|---|---|---|
| 2,953,513 | 9/1960 | Langer, Jr. | 208—56 |
| 3,252,888 | 5/1966 | Langer, Jr. | 208—56 |
| 3,499,835 | 3/1970 | Hansford | 208—111 |

DELBERT E. GANTZ, Primary Examiner

R. M. BRUSKIN, Assistant Examiner